(12) United States Patent
Lindgren et al.

(10) Patent No.: US 6,775,534 B2
(45) Date of Patent: Aug. 10, 2004

(54) TELECOMMUNICATIONS SYSTEM

(75) Inventors: Hans Åke Lindgren, Älvsjö (SE); Mats Ola Stille, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 514 days.

(21) Appl. No.: 09/833,728

(22) Filed: Apr. 13, 2001

(65) Prior Publication Data

US 2002/0002041 A1 Jan. 3, 2002

(30) Foreign Application Priority Data

Apr. 15, 2000 (GB) ............................................. 0009290

(51) Int. Cl.[7] ............................. H04Q 7/20; H04Q 7/28; H04Q 7/36
(52) U.S. Cl. ............................. 455/404.1; 455/404.2; 455/521; 455/466; 370/218; 370/351; 370/352; 370/354
(58) Field of Search ........................... 455/404.1, 404.2, 455/403, 414.1, 414.2, 414.3, 422.1, 426.1, 432.1, 432.3, 435.1, 445, 500, 517, 466, 521, 550.1, 552; 370/218, 351, 352, 353, 354, 355, 356, 473

(56) References Cited

U.S. PATENT DOCUMENTS

| | | | | |
|---|---|---|---|---|
| 5,797,091 A | * | 8/1998 | Clise et al. | ............... 455/404.2 |
| 5,881,131 A | | 3/1999 | Farris et al. | |
| 6,515,989 B1 | * | 2/2003 | Ronneke | ...................... 370/389 |

FOREIGN PATENT DOCUMENTS

| EP | 1109416 A2 | 6/2001 |
|---|---|---|
| JP | 10013927 | 6/1996 |

OTHER PUBLICATIONS

Satyabrata Chakrabarti et al.: "A Network Architecture For Global Wireless Position Location Services", Vancouver, CA, US, Jun. 6–10, 1999, New York, NY: IEEE, Jun. 6, 1999, pp. 1779–1783, XP000903675, ISBN: 0–7803–5285–8.

Jeffrey H. Reed et al.: "An Overview of the Challenges and Progress in Meeting the E–911 Requirement for Location Service", IEEE Communicatons Magazine, US, IEEE Service Center. Piscataway, NJ, vol. 36, No. 4, Apr. 1, 1998, pp. 30–37, XP000752568.

Henning G. Schulzrinne et al.: "The Session Initiation Protocol: Providing Advanced Telephony Services Across the Internet", Bell Labs Technical Journal, Oct. 1998, XP002164648.

M. Korpi et al.: "Supplementary Services in the H.323 IP Telephony Network", IEEE Communications Magazine, US, IEEE Service Center, Piscataway, NJ, vol. 37, No. 7, Jul. 1999, pp. 118–125, XP000835313, ISSN: 0163–6804.

J. Wang et al.: "Wireless Voice–Over–IP and Implications for Third–Generation Network Design", Bell Labs Technical Journal, US, Bell Laboratories, vol. 3, No. 3, Jul. 1, 1998, pp. 79–97, XP000782375, ISSN: 1089–7089.

Olle Granberg; "GSM On The Net", Ericsson Review No. 4, 1998, pp. 184–191.

* cited by examiner

*Primary Examiner*—William Trost
*Assistant Examiner*—Keith Ferguson

(57) ABSTRACT

There is described a system which, in a voice over IP radiotelecommunications system, allows a mobile station to make an emergency call, even though other calls would not be allowed at that time.

The mobile station includes an emergency call indication in the session activation request, and this is recognized by the network nodes, which then allow call set up.

7 Claims, 3 Drawing Sheets

TELECOMMUNICATIONS SYSTEM

This application claims priority under 35 U.S.C §§ 119 and/or 365 to 0009290.8 filed in Great Britain on Apr. 15, 2000; the entire content of which is hereby incorporated by reference.

TECHNICAL FIELD OF THE INVENTION

This invention relates to a telecommunications system, and to a method of operation thereof. More particularly, the invention relates to a telecommunications network using Internet Protocol (IP), and specifically to a system for handling emergency calls in such a network.

BACKGROUND OF THE INVENTION

In mobile communication systems, there are situations in which a call request may not be allowed. For example the user may not have paid a bill, or the mobile system may have no information at all about the user, or there may be congestion on the network, or the mobile phone may be reported stolen.

In the GSM system, emergency calls may be allowed even when one of these factors apply.

It is expected that $3^{rd}$ generation (3G) mobile phones will allow voice over IP. That is, the Internet Protocol (IP) will be used for the whole call from the mobile phone to the network gateway which is the connection to the public switched telephone network (PSTN) which includes the emergency services operator. Therefore, all calls will send the voice signals as packet data, rather than as circuit switched data.

The document "GSM on the Net", by Granberg, Ericsson Review No. 4, 1998 pages 184–191, describes a voice over IP system, based on the recommendation ITU H.323. The H.323 protocol separates call control (signalling in the call setup phase) from connection control (the actual data flows).

However, it provides no mechanism to allow for special treatment of emergency calls.

SUMMARY OF THE INVENTION

The present invention is concerned with allowing special treatment of emergency calls, so that such a call can be successful even though another voice call would not be allowed.

According to one aspect of the invention, a mobile communication device analyses a dialled number and, in the case of an emergency call, sends a session activation request which includes an emergency call indication.

According to another aspect of the invention, a node in a packet data communication network detects an emergency call indication in a session activation request, and allows call setup, even though a call without such an indication would fail.

According to another aspect of the invention,

DETAILED DESCRIPTION OF PREFERRED EMBODIMENTS

In accordance with the invention, when a mobile phone wishes to place an emergency call, it sets a special emergency call indication when requesting mobile system and radio resources.

Figure 1:
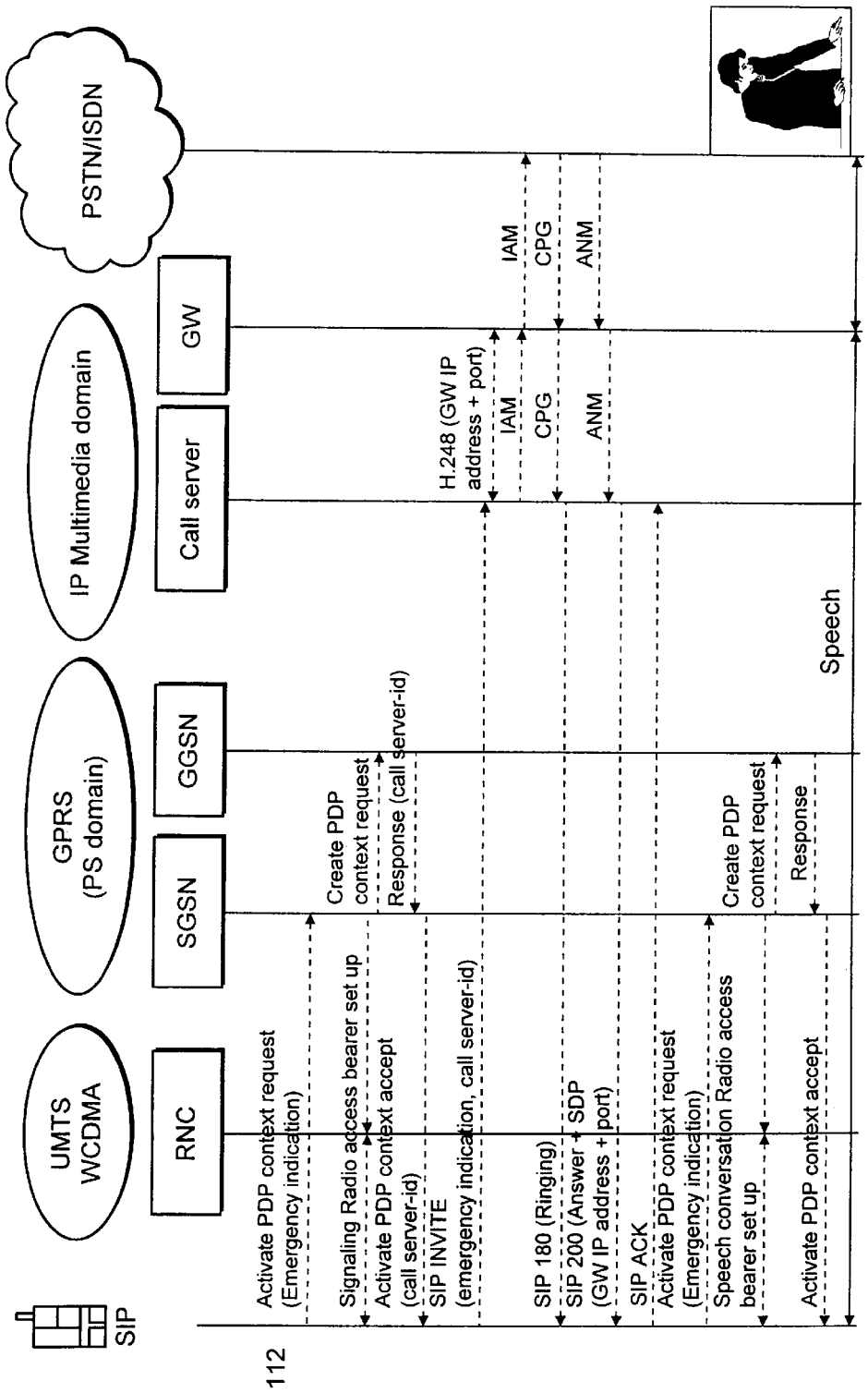
FIG. 1 is a diagram illustrating message flows during call setup in accordance with the invention.

FIG. 1 shows the network components required to connect a $3^{rd}$ generation mobile phone to an emergency services operator. A radio network controller (RNC) controls the air interface with a mobile station 10, and operates in the Universal Mobile Telephony System (UMTS) or using Wideband Code Division Multiple Access (WCDMA). The network operates using the General Packet Radio System (GPRS), and includes a Serving GPRS Service Node (SGSN) and a Gateway GPRS Service Node (GGSN). The GGSN is connected to a call server in the IP multimedia domain, and this is further connected to a gateway, which is connected to the public telephone network, operating for example as a Public Switched Telephone Network (PSTN) or Integrated Services Digital Network (ISDN) system. The emergency services operator is connected to the public telephone network.

Figure 2:
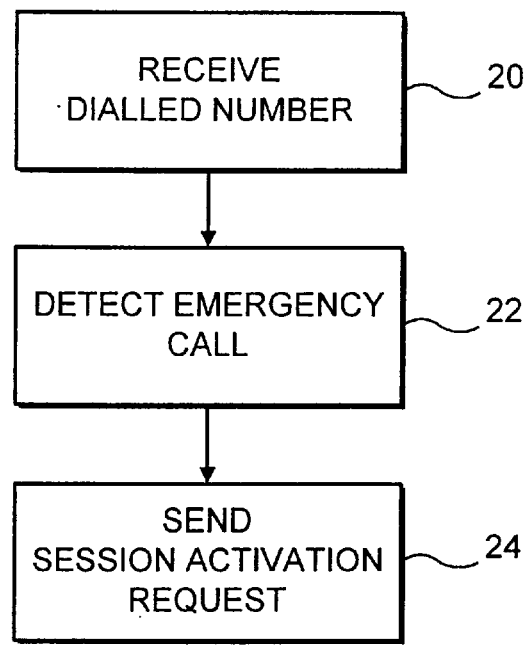
FIG. 2 is a flow chart showing a method carried out in a mobile phone in accordance with the invention.
Figure 3:
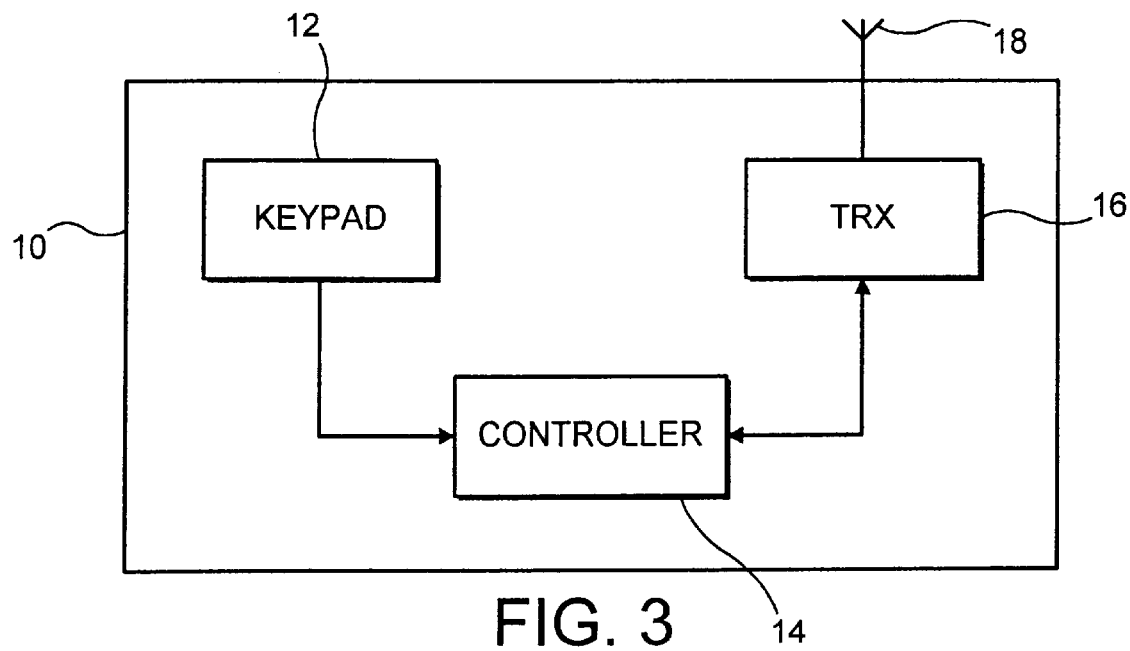
FIG. 3 is a schematic representation of a mobile phone in accordance with the invention.

The call setup procedure is also shown in FIG. 1, while FIG. 2 shows the procedure in the phone, and FIG. 3 is a representation of a phone 10. The procedure is described further with reference to the Session Initiation Protocol (SIP), described in IETF document IETF/RFC 2543. This protocol is part of the IETF multimedia data and control architecture, and can be used to set up calls between parties.

As shown in FIG. 1, a user enters a dialled number, for example via a keypad 12, which is sent to a controller 14, which then forms a message to be sent via transceiver circuitry 16 through an antenna 18.

In the controller 14, the dialled number is received (step 20 in FIG. 2), and the controller recognises from the dialled digits (for example, the numbers 112, 911 or 999), that the call is an emergency call. The session activation request which is then sent (step 24, and also see FIG. 1) is then handled accordingly.

The mobile phone has to activate a packet (IP) data communication session with the mobile GPRS system over the air interface. A first PDP activation (Activate PDP Context Request, according to the GSM recommendation 24.008) is sent from the mobile station to the SGSN to get a signalling radio bearer. When this has been obtained, the mobile station sends a second PDP activation to the SGSN, stipulating the need for a voice communication, allowing the user to speak to an operator at an emergency centre. The second PDP activation includes the requested bandwidth, delay and other quality of service parameters. These two radio bearers remain in parallel until the call is dropped.

In the illustrated embodiment of the invention, the two activation messages each include an indication that this is an emergency call. In the context of the GSM recommendation 24.008, the emergency indicator could for example be set by setting the Access Point Name (APN) to "EMERGENCY", Or something similar.

Thus, in more detail, the first session activation request is received by the 3G GPRS SGSN element. The SGSN recognises the received emergency call indication, and the SGSN will then not stop the call setup process, even if it would normally fail, for example because it cannot obtain user profile data or if unsuccessful authentication occurs.

The SGSN will send a Create PDP context request to the GGSN of the same network as the SGSN, to create a packet session with it. The context request will contain the special indication about an emergency call, received from the mobile phone as described above. This opens a communication path between the SGSN and the GGSN for this particular emergency call.

Since the GGSN has received the emergency call indication from the SGSN, the GGSN will determine the identity of the locally geographical VoIP call server that should receive forthcoming call control signals from the mobile phone. This can be done by software in the GGSN. This has the advantage that the call is routed out from the mobile system and to the public network emergency centre as fast as possible. This avoids the possibility that the call could be routed to the call server belonging to the home network of the user. If the user is roaming, this could conceivably be in another country.

This call server identity is thereafter returned by the GGSN to the SGSN in the acknowledgement message which relates to the first activation message. The call server identity can be an IP address in conventional format.

The SGSN then returns the call server identity back to the mobile phone, for example in the acknowledgement signal to the first Activate PDP context request message.

When the mobile phone gets a successful session activation acknowledgement from the mobile system, the mobile phone can start the voice over IP (VoIP) related call control signalling over the session. In this described embodiment, this call control signalling is as described in the IETF Session Initiation Protocol (SIP). The first signal, that is, the INVITE signal in SIP, will include the VoIP call server identity determined by the GGSN and received from the SGSN. When the mobile terminal receives the call server identity in the format of an IP address, the mobile terminal should set this address in the IP packet header "destination address" field at all times when sending SIP messages, including the INVITE message. In this way, network routers will route IP packets that are carrying such SIP messages, directed to the call server, correctly to the call server.

The call server can also typically be the same as handling all the normal VoIP calls as well. The initial message, for example the SIP INVITE message, includes an emergency indication as well, either the number dialled by the user e.g. 112 in a 3G UMTS European system or 911 in a 3G UMTS North America system, or a separate emergency indication. Alternatively, a new message could be defined, for example a SIP EMERGENCY INVITE message. Including the emergency indication avoids the possibility that the call server could treat the call as a normal voice call, with the possibility that it could stop the call process in the event of a failure to continue.

The call server then places an ISUP call to the appropriate PSTN signalling/media gateway for the emergency services operator using ISUP/IP, which routes the call using ISUP/SS7 to the operator. Then, as is conventional, a ringing response is sent using ISUP to the gateway, and using SIP to the call server and then to the mobile station. The response includes the address of the gateway.

This can then be used by the mobile station to create the required voice bearers to carry speech to the emergency services operator with the desired parameters, using the gateway address so that speech packets can reach the gateway. Thus, the mobile terminal sends a second Activate PDP Context request message, including an emergency indication, to the SGSN, which sets up a radio access bearer with the mobile terminal, and also sends a Create PDP Context request to the GGSN.

The GGSN responds to this message, and the SGSN sends an Activate PDO Context accepr message to the mobile terminal, after which a speech path is established between the mobile terminal and the emergency services operator.

Figure 4:
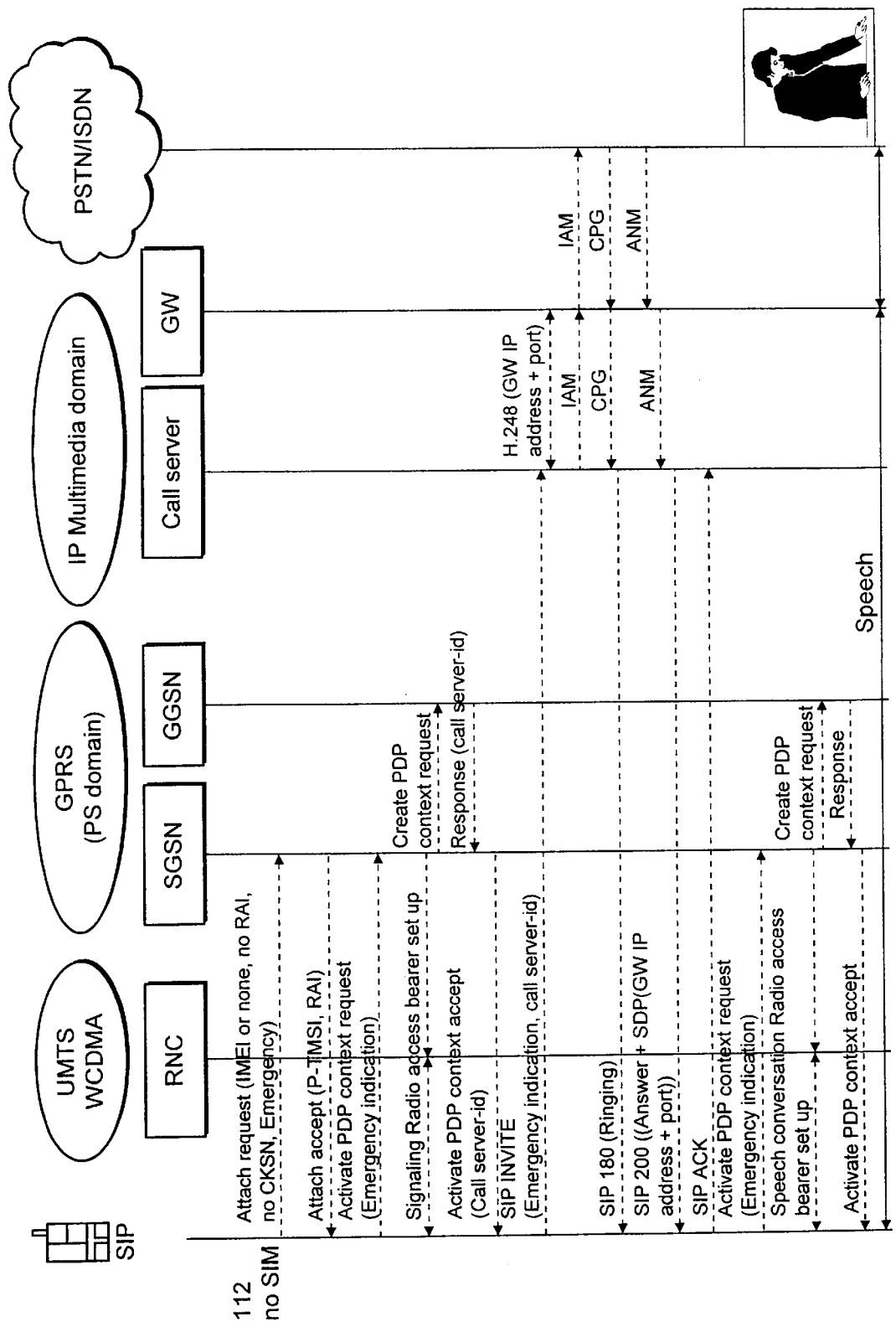
FIG. 4 is a diagram illustrating message flows during call setup in accordance with a second embodiment of the invention.

FIG. 4 illustrates a second call setup process according to the invention.

In the same way as FIG. 1, FIG. 4 also shows the network components required to connect a $3^{rd}$ generation mobile phone to an emergency services operator, namely a radio network controller (RNC) controlling the air interface with a mobile station 10. The network operates using the GPRS system, and includes a SGSN and a GGSN. The GGSN is connected to a call server in the IP multimedia domain, and this is further connected to a gateway, which is connected to the public telephone network, operating for example as a PSTN or ISDN system. The emergency services operator is connected to the public telephone network.

FIG. 4 shows the set up of an emergency call from a mobile station, when the mobile station does not contain a Subscriber Identity Module (SIM) card. In that case, it is conventionally not possible to initiate a call.

As in the procedure described with reference to FIG. 1, the mobile phone has to activate a packet (IP) data communication session with the mobile GPRS system over the air interface. In this case, when the mobile phone is without a SIM, it is permitted to form a limited attach. Thus, the mobile station sends an attach request via the RNC to the SGSN. In the attach request, the International Mobile Station Equipment Identity (IMEI) is transmitted as the mobile identity, and there is no Routing Area Indentification (RAI) or Ciphering Key Sequence Number (CKSN). An alternative is that the attach request should be allowed to be sent without any mobile identity.

In this embodiment of the invention, the only service allowed after formation of a limited attach is an emergency call. Therefore, the receipt by the SGSN of an attach request with the IMEI as the only identifier is a preliminary indication that an emergency call is required.

The formation of a limited attach is allowed in some situations where a normal attach would not be allowed, including in this case where no SIM is available. A normal attach should be used if possible. In the procedure illustrated in FIG. 4, the SGSN accepts the formation of the limited attach, and returns an attach accept message to the mobile station, with a Temporary Mobile Station Identifier (P-TMSI), and a Random Access Identifier (RAI).

The SGSN does not need to contact the Home Location Register (HLR) of the mobile station subscriber. Moreover, the SGSN does not perform any authentication or ciphering.

Thereafter, a request is sent from the mobile station to the SGSN to get a signalling radio bearer. When this has been obtained, the mobile station sends a second PDP activation request to the SGSN, stipulating the need for a voice communication, allowing the user to speak to an operator at an emergency centre. The second PDP activation includes the requested bandwidth, delay and other quality of service parameters. These two radio bearers remain in parallel until the call is dropped.

Preferably, the two activation messages each include an indication that this is an emergency call. In the context of the GSM recommendation 24.008, the emergency indicator could for example be set by setting the Access Point Name (APN) to "EMERGENCY", Or something similar.

Thus, in more detail, the first session activation request is received by the 3G GPRS SGSN element. The SGSN recognises the received emergency call indication, and the SGSN will then not stop the call setup process, even if it would normally fail, for example because it cannot obtain user profile data or if unsuccessful authentication occurs.

The SGSN will send a Create PDP context request to the GGSN of the same network as the SGSN, to create a packet session with it. The context request will contain the special indication about an emergency call, received from the mobile phone as described above. This opens a communication path between the SGSN and the GGSN for this particular emergency call.

Since the GGSN has received the emergency call indication from the SGSN, the GGSN will determine the identity of the locally geographical VoIP call server that should receive forthcoming call control signals from the mobile phone. This can be done by software in the GGSN. This has the advantage that the call is routed out from the mobile system and to the public network emergency centre as fast as possible. This avoids the possibility that the call could be routed to the call server belonging to the home network of the user. If the user is roaming, this could conceivably be in another country.

This call server identity is thereafter returned by the GGSN to the SGSN in the acknowledgement message which relates to the first activation message. The call server identity can be an IP address in conventional format.

The SGSN then returns the call server identity back to the mobile phone, for example in the acknowledgement signal to the first Activate PDP context request message.

When the mobile phone gets a successful session activation acknowledgement from the mobile system, the mobile phone can start the voice over IP (VoIP) related call control signalling over the session. In this described embodiment, this call control signalling is as described in the IETF Session Initiation Protocol (SIP). The first signal, that is, the INVITE signal in SIP, will include the VoIP call server identity determined by the GGSN and received from the SGSN. When the mobile terminal receives the call server identity in the format of an IP address, the mobile terminal should set this address in the IP packet header "destination address" field at all times when sending SIP messages, including the INVITE message. In this way, network routers will route IP packets that are carrying such SIP messages, directed to the call server, correctly to the call server.

The call server can also typically be the same as handling all the normal VoIP calls as well. The initial message, for example the SIP INVITE message, includes an emergency indication as well, either the number dialled by the user e.g. 112 in a 3G UMTS European system or 911 in a 3G UMTS North America system, or a separate emergency indication. Alternatively, a new message could be defined, for example a SIP EMERGENCY INVITE message. Including the emergency indication avoids the possibility that the call server could treat the call as a normal voice call, with the possibility that it could stop the call process in the event of a failure to continue.

The call server then places an ISUP call to the appropriate PSTN signalling/media gateway for the emergency services operator using ISUP/IP, which routes the call using ISUP/SS7 to the operator. Then, as is conventional, a ringing response is sent using ISUP to the gateway, and using SIP to the call server and then to the mobile station. The response includes the address of the gateway.

This can then be used by the mobile station to create the required voice bearers to carry speech to the emergency services operator with the desired parameters, using the gateway address so that speech packets can reach the gateway. Thus, the mobile terminal sends a second Activate PDP Context request message, including an emergency indication, to the SGSN, which sets up a radio access bearer with the mobile terminal, and also sends a Create PDP Context request to the GGSN.

The GGSN responds to this message, and the SGSN sends an Activate PDO Context accepr message to the mobile terminal, after which a speech path is established between the mobile terminal and the emergency services operator.

It should be noted that, although the invention has been described with particular reference to a GPRS based mobile telephone system using the IETF SIP, it is applicable to any mobile communication system, which offers real-time packet (IP) data communication, with any type of call control protocol, including for example ITU-T H.323.

There is thus described a method which allows an emergency call to be placed even when other calls would not be allowed.

What is claimed is:

1. A network node for use in a packet data communications network, the node comprising means for detecting an emergency call indication in a received session activation request, and being adapted, in the event that an emergency call indication is detected, to set up a call even if normal call setup criteria are not met wherein said node is a SGSN element and wherein said SGSN element further adapted to create a packet session with a GGSN, including a further emergency call indication.

2. A node as claimed in claim 1, wherein the node is adapted, in the event that an emergency call indication is detected, to set up a call even if the received session activation request includes no mobile station identifier.

3. A node as claimed in claim 2, adapted, in the event that an emergency call is detected, to return a message indicating a call server local to a calling device.

4. A node as claimed in claim 1, wherein the node is a GGSN element.

5. A method of operation of a node in a packet data communications network, the method comprising: detecting an emergency call indication in a received session activation request, and if an emergency call indication is detected, setting up a call even if normal call setup criteria are not met wherein said node is a SGSN element; and if an emergency call indication is detected, creating a packet session with a GGSN, including a further emergency call indication.

6. A method as claimed in claim 5, wherein the node is a SGSN element, and the method further comprises, in the event that an emergency call indication is detected, setting up a call even if the received session activation request includes no mobile station identifier.

7. A method as claimed in claim 5, wherein the node is a GGSN element, and the method further comprises: if an emergency call indication is detected, returning a message indicating a call server local to a calling device.

* * * * *